(12) United States Patent
Crestol

(10) Patent No.: US 8,082,010 B2
(45) Date of Patent: Dec. 20, 2011

(54) WIRELESS HEADSET SWITCHING SYSTEM

(75) Inventor: Steve Crestol, Valencia, CA (US)

(73) Assignee: Stealthwear, Valencia, CA (US)

( * ) Notice: Subject to any disclaimer, the term of this patent is extended or adjusted under 35 U.S.C. 154(b) by 604 days.

(21) Appl. No.: 12/142,572

(22) Filed: Jun. 19, 2008

(65) Prior Publication Data

US 2008/0318639 A1 Dec. 25, 2008

Related U.S. Application Data

(60) Provisional application No. 60/945,021, filed on Jun. 19, 2007.

(51) Int. Cl.
*H04B 1/38* (2006.01)
*H04M 1/00* (2006.01)

(52) U.S. Cl. .......... 455/569.1; 455/41.1; 455/41.2; 455/575.2; 455/575.6

(58) Field of Classification Search ........ 455/41.1, 455/41.2, 569.1, 556.1, 557, 575.2, 575.6, 455/90.3
See application file for complete search history.

(56) References Cited

U.S. PATENT DOCUMENTS

2005/0064915 A1* 3/2005 Lair .................... 455/569.1
2005/0239487 A1* 10/2005 Glass et al. ............ 455/519

* cited by examiner

*Primary Examiner* — Tuan Pham
(74) *Attorney, Agent, or Firm* — Steptoe & Johnson LLP

(57) ABSTRACT

Switching signals between a mobile communications device and a wireless headset can include setting a switch in a first position; connecting, through the switch, signals received from a mobile communications device to a wireless adapter for transmission to a wireless headset; and repositioning the switch, in response to input, to a second position, wherein signals received by the wireless adapter from the wireless headset are connected through the switch to the mobile communications device. Further, signals can be transmitted from the wireless adapter to the wireless headset using a short-range radio frequency protocol. Additionally, the input in response to which the switch is repositioned can be received from a hand-held trigger switch.

19 Claims, 8 Drawing Sheets

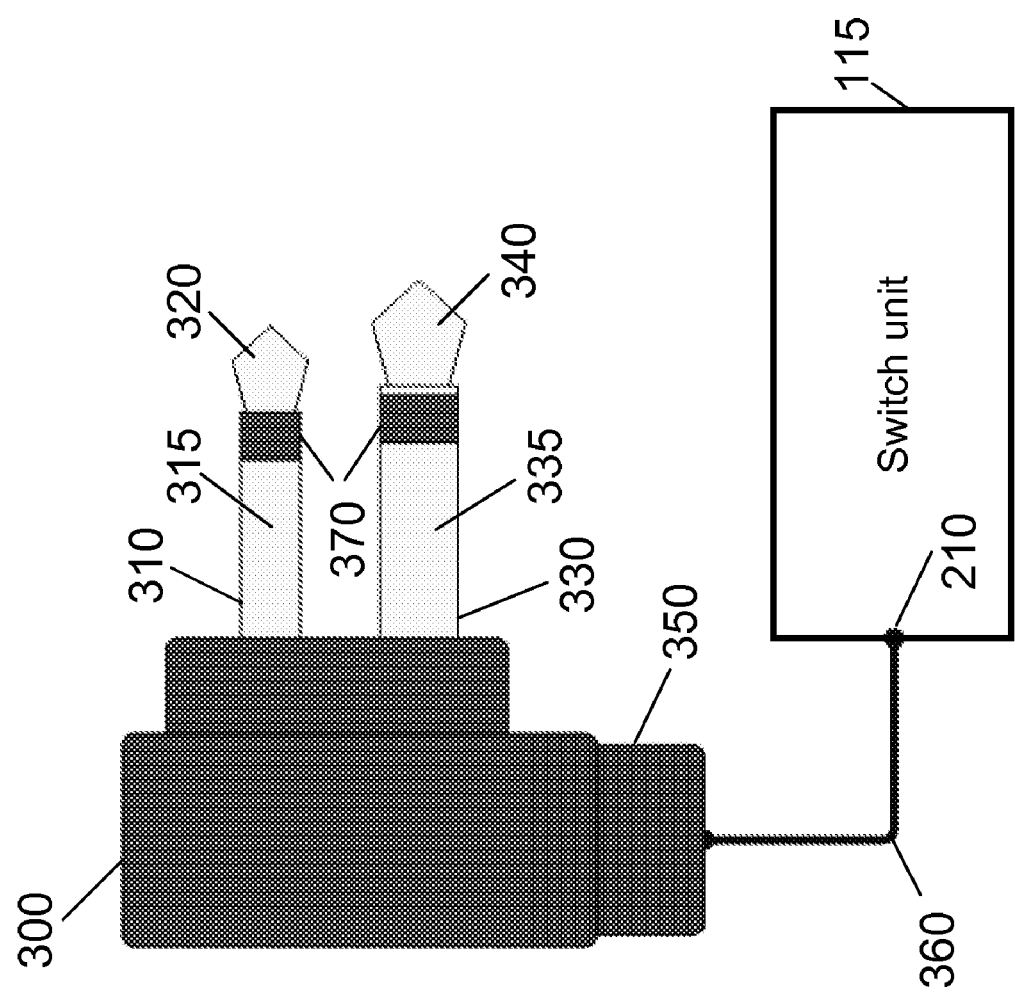

WIRELESS HEADSET SWITCHING SYSTEM

PRIORITY CLAIM AND RELATED APPLICATION

This application claims the benefit of U.S. Provisional Application No. 60/945,021 entitled "Wireless Headset Switching System" and filed Jun. 19, 2007, the disclosure of which is incorporated by reference as part of the specification of this application.

BACKGROUND

The disclosure relates generally to mobile communications systems and, more particularly, to a wireless headset switching system that can be coupled with a mobile communications device, including a device configured to operate in a push-to-talk mode.

The use of mobile communications devices in various forms and for various functions continues to expand rapidly. While new devices frequently offer new functionality, many continue to offer established functions that have proven invaluable to users. One such established function is the push-to-talk capability typically associated with handheld two-way radio transceivers, or commonly, "walkie talkies". While push-to-talk functionality was originally developed for military use, today it serves as a valuable communication feature in many other contexts, including industrial, commercial, public safety, and recreational applications. Push-to-talk functionality is characterized by half-duplex (or simplex) communication, in which only one device may transmit at a time, though multiple devices can receive the transmission. Typically a button or switch is used to enable a mobile communications device to transmit a communication when the button or switch is in a first position. When the button or switch is in a second position, the device is in a listen mode, in which it can only receive communications.

Traditionally, mobile communications devices have included one or more built-in speakers and microphones. Some devices also have been configured to support the connection and use of a wired external microphone, wired speaker headphone, or wired headset including one or more microphones and one or more speakers.

SUMMARY

A wireless headset switching system can be configured to enable the use of a wireless headset in conjunction with a mobile communications device. Further, the mobile communications device and switching system can be configured to implement a push-to-talk capability. The wireless headset can be used to capture audio information from and deliver audio information to a user. The wireless headset also can communicate with a wireless adapter that is coupled to the mobile communications device. In addition, the system can be configured to include a button or switch that can be actuated to enable the transmission of audio information from a microphone corresponding to the wireless headset through the mobile communications device. Further, the system also can be configured to allow the transmission of signals to the wireless headset only when the button is not pushed or the switch is not activated.

The wireless headset and the wireless adapter can communicate using a wireless transmission medium. For example, the wireless headset and wireless adapter can communicate using a short-range radio frequency protocol, such as Bluetooth®. In order to facilitate use with a mobile communications device, the present inventor recognized the need to couple the wireless adapter with a push-to-talk switch. The present inventor also recognized the need to house the wireless adapter and push-to-talk switch together in a single switching unit. The push-to-talk switch can be configured to control the flow of signals between the wireless adapter and the mobile communications device, such as through a mobile communications device connector. The inventor also recognized the need for one or more of the wired connections to the switching unit to be detachably coupled, such as through a plug connector.

In general, in one aspect, the subject matter can be implemented as a system comprising a mobile communications device, a wireless headset including a speaker and a microphone, and a switching unit comprising: a mobile communications device interface for transmitting signals to and receiving signals from the mobile communications device, a wireless adapter for transmitting signals to and receiving signals from the wireless headset, and a switch coupled to the mobile communications device interface and the wireless adapter, wherein the switch is configured to implement push-to-talk functionality by selectively connecting signals between the wireless adapter and the mobile communications device interface.

The subject matter also can be implemented such that the wireless headset and the wireless adapter use a short-range radio frequency protocol to communicate. Further, the subject matter can be implemented such that the short-range radio frequency protocol comprises the Bluetooth protocol. Additionally, the subject matter can be implemented to include at least one direct connection between the mobile communications device interface and the wireless adapter.

The subject matter also can be implemented such that the switch comprises a hand-held trigger switch. Further, the subject matter can be implemented such that the hand-held trigger switch is detachably coupled to the switching unit. The subject matter also can be implemented such that the switch is automatically switched to the first position in response to a signal level associated with the microphone that exceeds a predetermined threshold. Additionally, the subject matter can be implemented such that the switch is switched automatically to a second position in response to the signal level associated with the microphone dropping below the predetermined threshold for a predetermined period of time.

In general, in another aspect, the subject matter can be implemented as an apparatus comprising a mobile communications device interface for transmitting signals to and receiving signals from a mobile communications device, a wireless adapter for transmitting signals to and receiving signals from a wireless headset, a switch coupled to the mobile communications device interface and the wireless adapter, wherein the switch is configured to implement push-to-talk functionality by selectively connecting signals between the wireless adapter and the mobile communications device interface, and a trigger coupled to the switch for receiving input to select a position of the switch.

The subject matter also can be implemented such that the mobile communications device interface, the wireless adapter, and the switch are included in a common housing. Further, the subject matter can be implemented such that the switch and the trigger are housed in a hand-held trigger switch. Additionally, the subject matter can be implemented such that the wireless adapter is configured to communicate using a short-range radio frequency protocol.

In general, in another aspect, the subject matter can be implemented to include setting a switch in a first position, connecting, through the switch, signals received from a mobile communications device to a wireless adapter for transmission to a wireless headset, and repositioning the switch, in response to input, to a second position, wherein signals received by the wireless adapter from the wireless headset are connected through the switch to the mobile communications device. Further, the subject matter can be implemented such that the input corresponds to a signal level associated with a microphone of the wireless headset. The subject matter also can be implemented to include repositioning the switch to the first position in response to the signal level associated with the microphone of the wireless headset dropping below a predetermined threshold. Additionally, the subject matter can be implemented to include transmitting signals from the wireless adapter to the wireless headset using a short-range radio frequency protocol.

The techniques described in this specification can be implemented to realize one or more of the following advantages. For example, the techniques can be implemented to permit use of a mobile communications device with a separate wireless headset. Further, the techniques can be implemented to permit the use of a button or switch that serves as a push-to-talk actuator and controls the transmission of signals between the wireless headset and the mobile communications device. The techniques also can be implemented to reduce the occurrence of tangling and breaking associated with using a headset in conjunction with a mobile communications device. Further, the techniques can be implemented such that the switching unit is constantly powered and received communications thus can be connected without any delay, reducing the occurrence of audio defects, such as the loss of audio data. Additionally, the techniques can be implemented to permit coupling with a mobile communications device a wireless headset that also is capable of communicating with other devices, without having to modify a physical connection associated with either the wireless headset or the mobile communications device.

The details of one or more implementations are set forth in the accompanying drawings and the description below. Other features and advantages will be apparent from the description and drawings, and from the claims.

BRIEF DESCRIPTION OF THE DRAWINGS

FIG. 3 shows an exemplary mobile communications device connector.

Like reference symbols indicate like elements throughout the specification and drawings.

DETAILED DESCRIPTION

Figure 1:
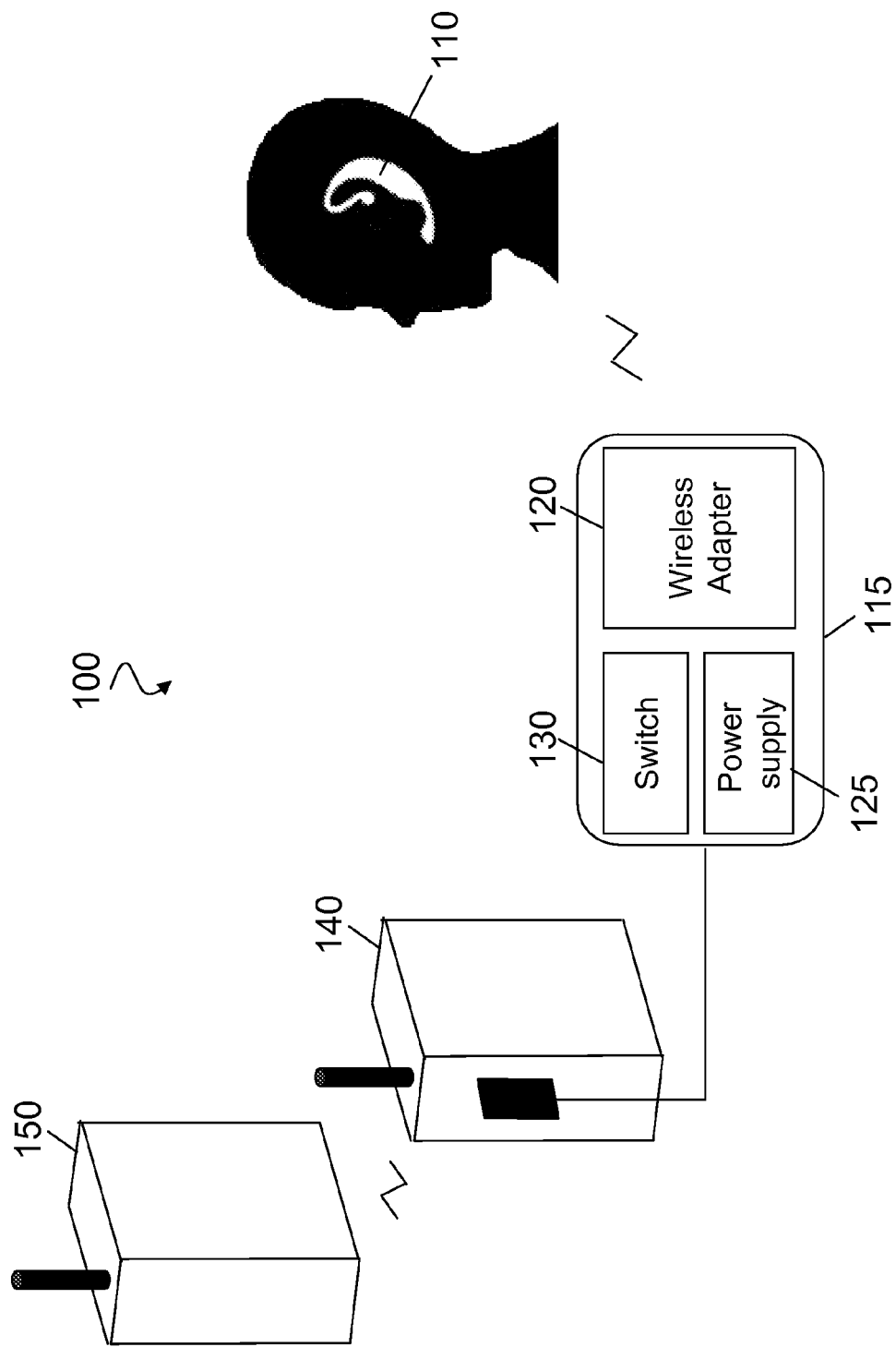
FIG. 1 shows an exemplary communication system.

FIG. 1 shows an exemplary communication system 100. The communication system 100 includes a wireless headset 110, which can be worn or carried by a user. The wireless headset 110 can include one or more microphones configured to capture audio information, such as verbal communication of the user. The wireless headset 110 also can include one or more speakers to output audio information to the user. In an implementation, the wireless headset 110 further can include analog and/or digital electronics configured to enhance the signals associated with the one or more speakers and/or microphones, such as amplification, filtering, and noise reduction/cancellation.

The wireless headset 110 also can include a power supply (not shown), which can be configured to provide power to one or more components included in the wireless headset 110. For example, the power supply can include one or more rechargeable batteries. In some implementations, during operation of the wireless headset 110, the power supply provides continuous power sufficient to maintain each of the components in an operable state. Thus, signals can be transmitted and received by the wireless headset 110 without any delay or "wake-up" period.

Further, the wireless headset 110 can include a wireless interface for communicating with a wireless adapter 120, such as a transmitter and a receiver. The wireless interface included in the wireless headset 110 can be configured to operate using any wireless transmission medium, including radio frequency and infrared signals. For example, the wireless headset 110 can be configured to transmit and receive signals in the frequency range of 2.4 GHz to 2.48 GHz. The wireless headset 110 further can employ a frequency hopping algorithm. Alternatively, other frequency ranges can be used. Additionally, the wireless headset 110 can be configured to communicate using any communication protocol. In an implementation, the wireless headset 110 can use a short-range radio frequency communication protocol, such as Bluetooth or a proprietary protocol.

Similarly, the wireless adapter 120 can include a wireless interface for communicating with the wireless headset 110, such as a transceiver or a transmitter and a receiver. The wireless adapter 120 also can include a wired interface for communicating with a switch 130. Thus, the wireless adapter 120 can be configured to convey signals received from the wireless headset 110 to the switch 130 and to convey signals received from the switch 130 to the wireless headset 110. The wireless interface of the wireless adapter 120 also can be configured to operate using any wireless transmission medium, including radio frequency and infrared signals. For example, the wireless adapter 120 can be configured to transmit and receive signals in the frequency range of 2.4 GHz to 2.48 GHz. The wireless adapter 120 also can be configured to communicate using any communication protocol, including a short-range radio frequency communication protocol, such as Bluetooth. Further, the wireless adapter 120 can be configured such that it is compatible and interoperable with the wireless headset 110. Additionally, the wireless adapter 120 and the switch 130 can be housed together in a switching unit 115. In another implementation, the wireless adapter 120 and the switch 130 can be contained in separate housings.

The switch 130 also can be coupled to a mobile communications device 140, such as a mobile or portable two-way radio device (or "walkie-talkie"), through an additional wired interface. Thus, signals received by the mobile communications device 140 can be transmitted to the wireless headset 110 and output to a user. For example, the signals can be output to a user through the one or more speakers included in the wireless headset 110. Further, signals received by the wireless headset 110, such as verbal communication by a user received by one or more microphones, can be transmitted to the mobile communications device 140. Additionally, the mobile communications device 140 can be configured to communicate with one or more other mobile communications devices 150, such as through radio frequency transmissions.

Additionally, the switching unit 115 can include a power supply 125, which can be configured to provide power to one or more components, such as the wireless adapter 120. For example, the power supply 125 can include one or more rechargeable or non-rechargeable batteries. In some implementations, during operation of the switching unit 115, the power supply 125 provides continuous power sufficient to maintain each of the components in an operable state. Thus, received signals can be connected through the switching unit 115 without any delay or "wake-up" period.

Figure 2A:
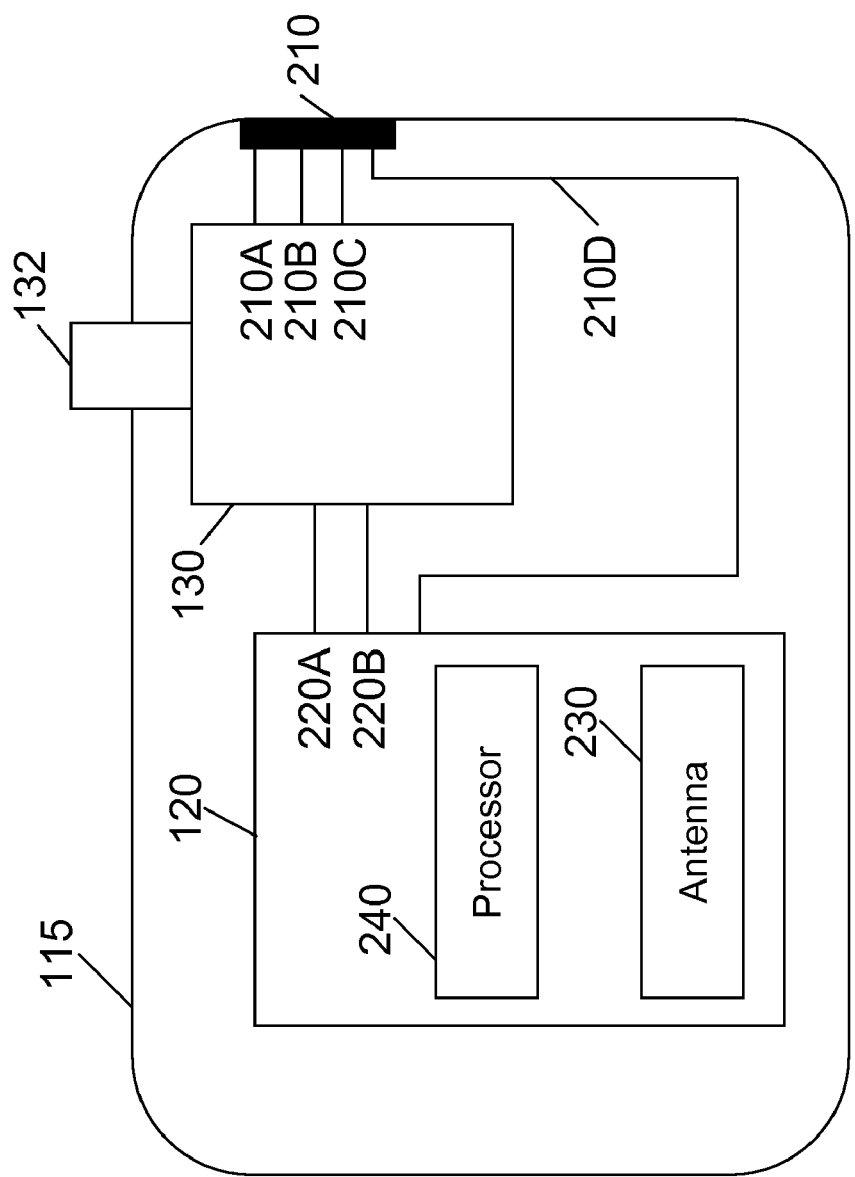
FIGS. 2A-2C show exemplary switching units including wireless adapters and switches.

FIG. 2A shows an exemplary wireless adapter 120 and a switch 130 housed in a switching unit 115. The switching unit 115 can be configured to include a down lead 210 that is connected to an external cable. In other implementations, the external cable can be removeably (or detachably) coupled to the switching unit 115, such as through a plug-and-jack connection. The down lead 210 can transmit signals to and from the switching unit 115. One or more wires can be connected to the down lead 210 to form an electrical connection with one or more components in the switching unit 115, including the wireless adapter 120 and the switch 130. For example, the down lead 210 can include wires 210A, 210B, and 210C, which can be connected to the switch 130. Further, the down lead 210 can include the wire 210D, which can be connected directly to the wireless adapter 120.

The wires connected to the down lead 210 can correspond to electrical connections associated with one or more external devices. For example, the wires connected to the down lead 210 can correspond to one or more microphones and speakers associated with an external communication device, such as a mobile communications device. Further, the wires connected to the down lead 210 can be used to route signals transmitted and received by the one or more external devices. A trigger 132 can be used to select the position of the switch 130.

The wireless adapter 120 also can include a wired interface to which one or more wires are coupled. For example, the wireless adapter 120 can include wires 220A and 220B, which couple the wireless adapter 120 to the switch 130. The wireless adapter 120 further can include a direct connection to the down lead 210, such as the wire 210D. Additionally, the wireless adapter 120 can include one or more components, such as an antenna 230 and a processor 240. The processor 240 can be a general purpose processor or a specialized processor adapted to facilitate communication over a particular protocol, such as Bluetooth. Further, the antenna 230 can be configured to transmit signals to and receive signals from a corresponding device, such as the wireless headset 110.

Figure 2B:
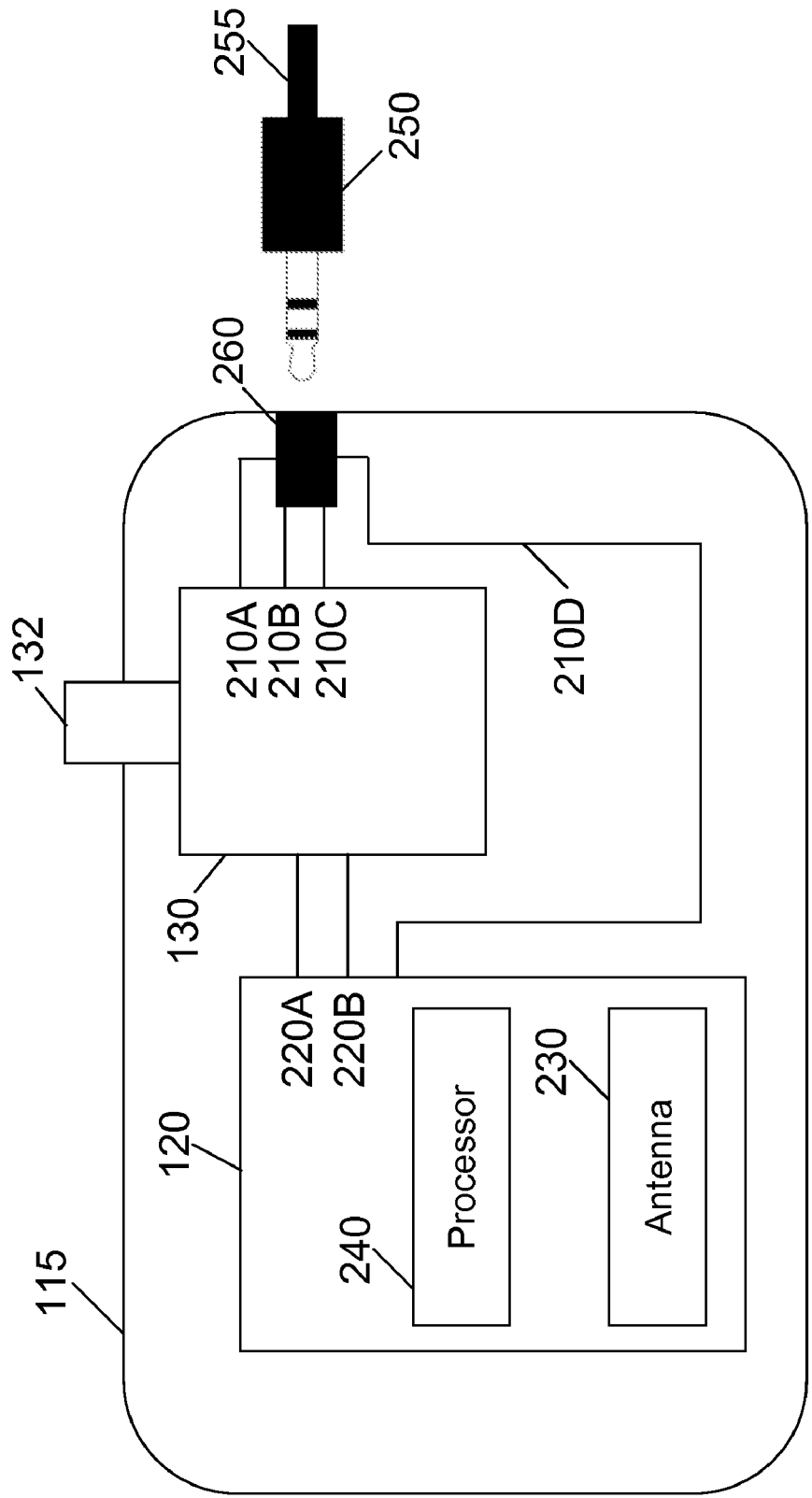

FIG. 2B also shows an exemplary wireless adapter 120 and a switch 130 housed in a switching unit 115. The switching unit 115 can be configured such that a wired connection to an external communication device is formed using a plug-and-jack connection. A plug 250 can be connected to an end of a cable 255 that is to be coupled to the switching unit 115. The plug 250 can have one or more prongs of any size, and each prong further can have one or more contacts. Further, the contacts can correspond to speaker and/or microphone connections associated with the external communication device. Additionally, the plug 250 can be detachably coupled with a jack 260 included in the switching unit 115. The jack 260 can include one or more contacts corresponding to the contacts of the plug 250. Further, one or more wires connected to the switch 130 and the wireless adapter 120 also can be coupled to contacts associated with the jack 260.

Figure 2C:
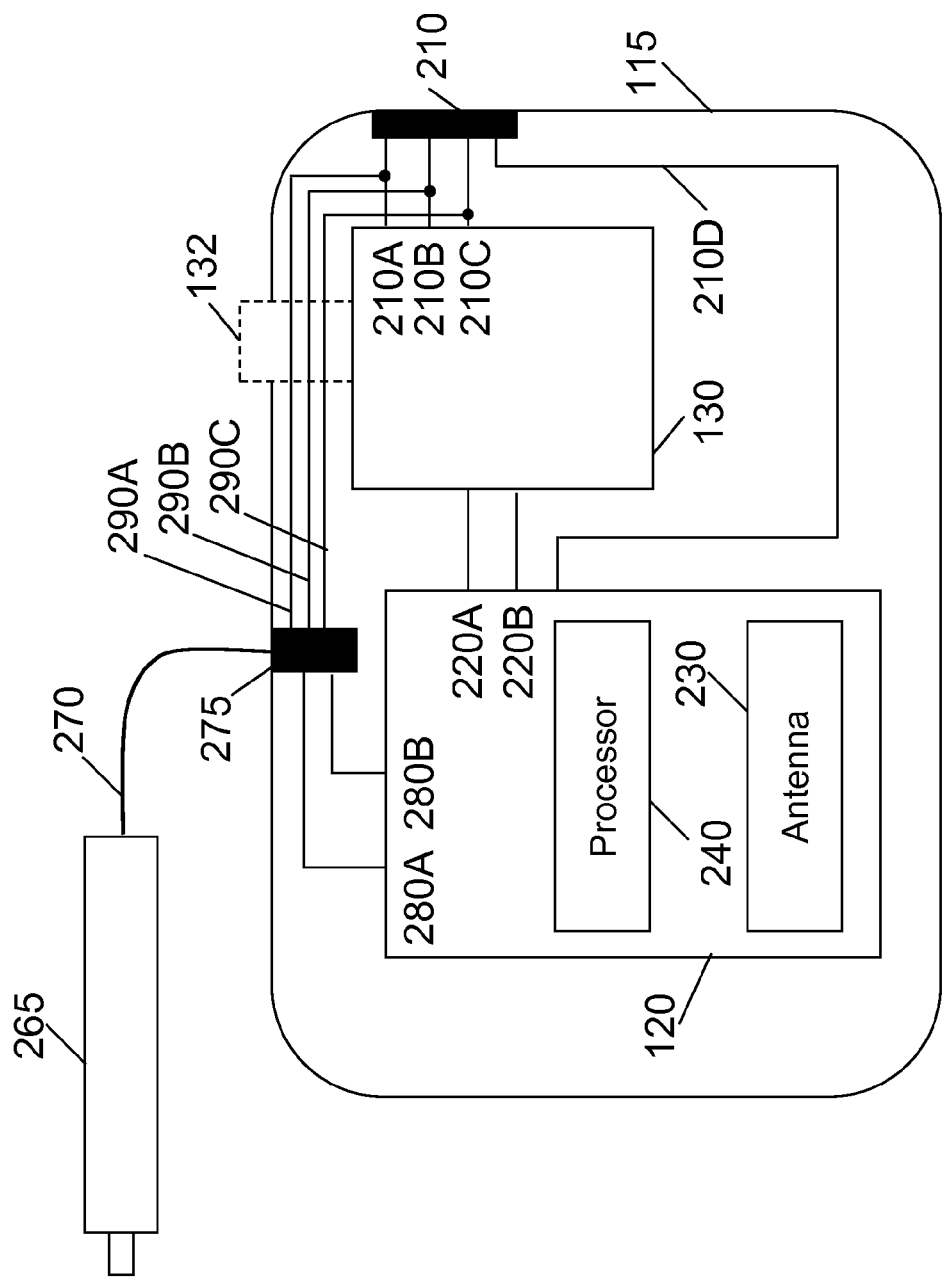

FIG. 2C also shows an exemplary wireless adapter 120 and a switch 130 housed in a switching unit 115. Additionally, a hand-held trigger switch 265 can be coupled to the switching unit 115. In some implementations, coupling the hand-held trigger switch 265 to the switching unit can disable the switch 130. Alternatively, both the switch 130 and the hand-held trigger switch 265 can be operable simultaneously, such that either can be used to switch signals between the wireless adapter 120 and the mobile communications device 140.

The hand-held trigger switch 265 can be coupled to the switching unit 115 through a cable 270, which can be fixedly or detachably coupled to a corresponding trigger interface 275. For example, the cable 270 can include a plug connector and the trigger interface 275 can include a jack configured to receive the plug connector. Further, the cable 270 can include one or more wires, connected through the trigger interface 275, which operably couple the hand-held trigger switch 265 to the components of the switching unit 115. For example, the wires 290A, 290B, and 290C can connect the trigger interface 275 with the down lead 210. Additionally, the trigger interface 275 can be coupled to the wireless adapter 120 through the wires 280A and 280B.

FIG. 3 shows an exemplary mobile communications device connector 300 coupled to the switch unit 115. The mobile communications device connector 300 can be configured as a dual-plug connector. In some implementations, a different plug configuration can be used based on the signals to be transmitted and/or the interface of the mobile communications device. For example, a plug connector such as a TRS connector also can be used. Further, the mobile communications device connector 300 can be coupled to the switching unit 115 by a cable 360 that includes one or more wires, such as at the down lead 210. In some implementations, the cable 360 also can include a plug connector that can be detachably coupled to the switch unit 115.

The mobile communications device connector 300 can include a plug body 350, a first plug 310, and a second plug 330. The first plug 310 and the second plug 330 can be of equal or different sizes. The first plug 310 can include a sleeve 315 and a tip 320, which are electrically conductive. Further, the first plug 310 can include one or more portions that correspond to signals received and/or generated by a particular system component, such as a microphone or a speaker. For example, the sleeve 315 of the first plug 310 can correspond to an electrically negative microphone connection and the tip 320 can correspond to an electrically positive microphone connection.

Similarly, the second plug 330 can include a sleeve 335 and a tip 340, which also are electrically conductive. The second plug 330 also can include one or more portions that correspond to signals received and/or generated by a particular system component, such as a microphone or a speaker. For example, the sleeve 335 of the second plug 330 can correspond to an electrically negative headphone connection and the tip 340 can correspond to an electrically positive headphone connection. Additionally, the first plug 310 and the second plug 330 can include one or more insulating rings 370 to separate electrically conductive portions.

Figure 4:
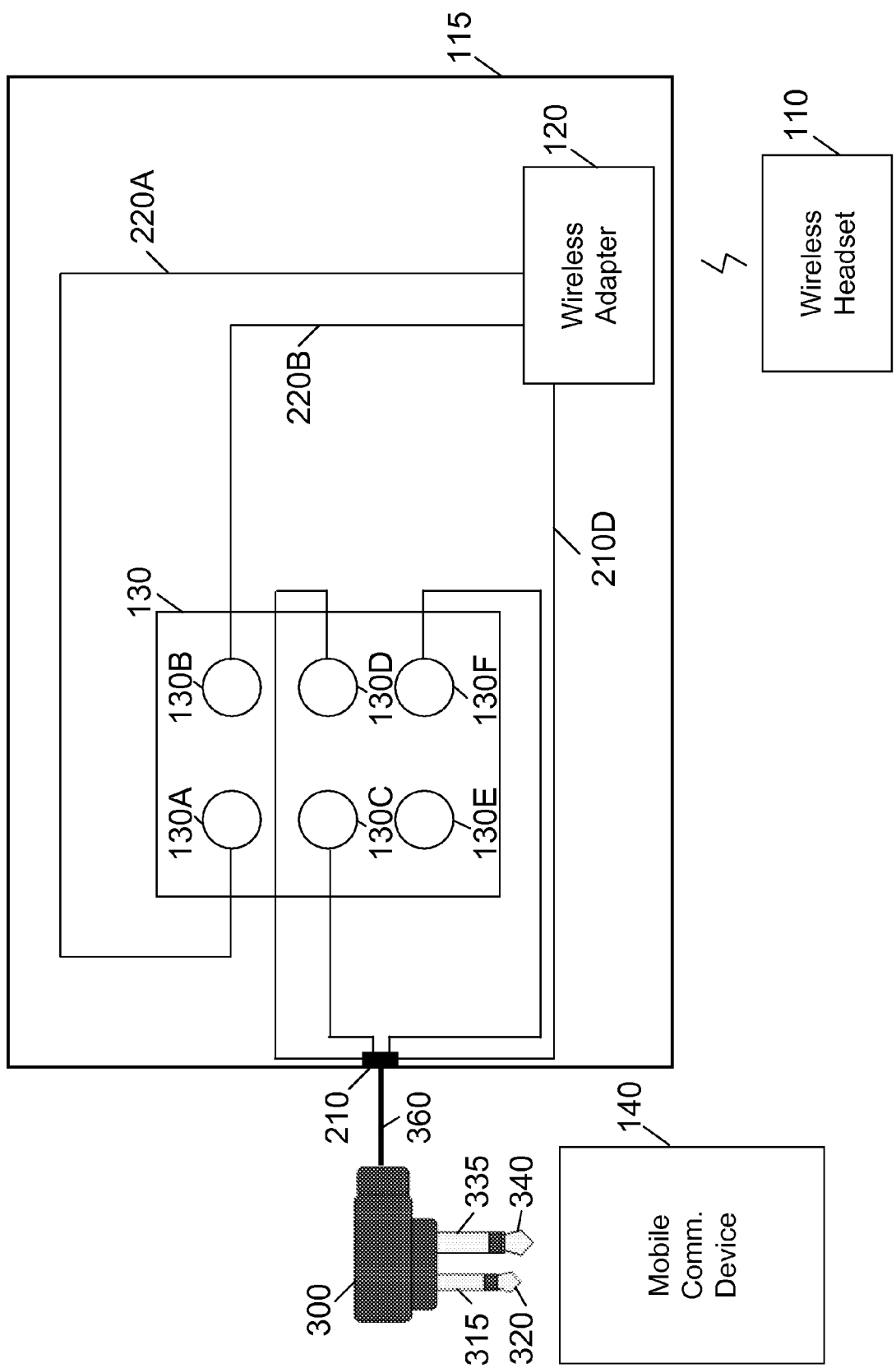
FIG. 4 shows an exemplary switch and interconnections between a wireless adapter and a mobile communications device.

FIG. 4 shows an exemplary switch and interconnections between a wireless adapter and a mobile communications device. The switch 130 can be any switch known in the art through which the disclosed connections can be achieved. In some implementations, the switch 130 can be configured using a double pole, double throw ("DPDT") switch. In some other implementations, the hand-held trigger switch 265 can be used in addition to or in place of the switch 130.

The switch 130 includes a plurality of connections, including connections 130A, 130B, 130C, 130D, 130E, and 130F. A wire associated with a component or device, such as the wireless adapter 120, can be connected to the switch 130. The connection between the wire and the switch 130 can be nondetachable, such as a soldered or clamped connection that is intended to be permanent. In another implementation, the connection with the switch can be implemented through a detachable connector, such as a plug or jack connector that contacts an electrically conductive portion of the switch. In such an implementation, the connection with the switch can be broken by extracting the connector.

To couple the wireless adapter 120 and the mobile communications device 140, one or more connections associated with the wireless adapter 120 and the mobile communications device connector 300 can be electrically coupled through the switch 130. For example, the wire 220A associated with the wireless adapter 120 can be coupled with a first connection 130A corresponding to a first common connection. The wire 220B associated with the wireless adapter 120 further can be connected to a second connection 130B, which corresponds to the second common connection of the switch 130. The common connections 130A and 130B are connections that are commonly shared by each switch position.

Similarly, the tip 320 of the first plug 310 included in the mobile communications device connector 300 can be connected through the down lead 210 to the third connection 130C of the switch 130, which corresponds to a first normally open connection. Further, the sleeve 315 of the first plug 310 can be connected through the down lead 210 to the fourth connection 130D, which corresponds to the second normally open connection.

The normally open connections 130C and 130D are typically open and unconnected in the switch 130. Thus, when the switch 130 is in a first position, the microphone connections 315 and 320 corresponding to the mobile communications device 140 are electrically uncoupled. When the switch 130 is moved to a second position, however, the microphone connections 315 and 320 corresponding to the mobile communications device 140 are electrically coupled to the microphone and common connections of the wireless adapter 120. Thus, signals generated by the one or more microphones associated with the wireless headset 110 can be transmitted to the mobile communications device 140 through the switch 130.

Further, the sleeve 335 of the second plug 330 included in the mobile communications device connector 300 can be connected to the sixth connection 130F of the switch 130, which corresponds to a normally closed connection. Thus, when the switch 130 is in the first position, the negative headphone connection of the sleeve 335 is electrically coupled to a common connection of the wireless adapter 120. Additionally, the tip 340 of the second plug 330 can be directly coupled to a headphone connection, such as the wire 210D, of the wireless adapter 120 through the switch 130.

Thus, when the switch 130 is in the first position, corresponding to the normally closed connections, signals generated by the mobile communications device 140 that are to be output by a speaker can be transmitted to the wireless headset 110 through the switch 130 and the wireless adapter 120. Alternatively, the switch 130 can be moved to the second position, prior to a user speaking, to permit the signals captured by the one or more microphones included in the wireless headset 110 to be transmitted through the wireless adapter 120 and the switch 130 to the mobile communications device 140. A user can selectively actuate the switch 130 to control transmitting and receiving through the mobile communications device 140.

In an implementation, the switch 130 can be configured to be automatically actuated. Thus, the switch 130 can select the second position when a signal level associated with a microphone connection 220A of the wireless adapter 120 exceeds a predetermined threshold. For example, the threshold can correspond to a signal level associated with speech by a wireless headset 110 user. In some implementations, audio level detection circuitry can be configured to generate a trigger signal when the signal level associated with a microphone of the wireless headset 110 exceeds a predetermined threshold. The trigger signal further can cause the switch 130 to be positioned in the second position.

Further, the switch 130 can be configured to select the first position once the signal level associated with the microphone connection 220A of the wireless adapter 120 drops below a predetermined threshold, such as for a predetermined period of time. Additionally, in some implementations, the audio level detection circuitry can be configured to generate another trigger signal when the signal level associated with a microphone of the wireless headset 110 falls below a predetermined threshold. The communication system 100 also can be configured such that the default position of switch 130 is the first position. In another implementation, the default position of the switch 130 or the connections to the switch 130 can be reversed.

Figure 5:
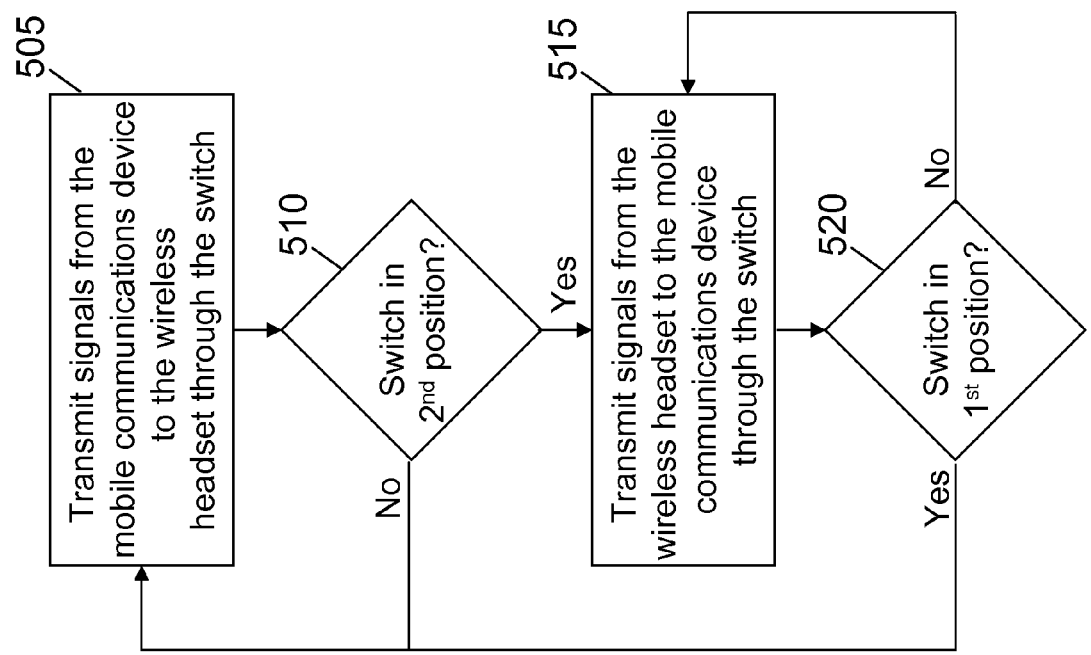
FIG. 5 discloses an exemplary method of implementing push-to-talk functionality using a switch.

FIG. 5 discloses a method of implementing push-to-talk functionality using the switch 130 in the communication system 100. Signals are transmitted from the mobile communications device 140 to the wireless headset 110 through the switch 130 and the wireless adapter 120 when the switch 130 is in the first position (505). For example, a user of the wireless headset 110 can maintain the switch 130 in the first position to hear communications received by the mobile communications device 140. While the switch 130 is in the first position (510), signals received by the mobile communications device 140 are routed to the wireless headset 110 and can be output through one or more speakers (505). The signals received by the mobile communications device 140 are routed through the circuitry of the switching unit 115, including an interface to the mobile communications device 140, such as the down lead 210. In another implementation, the function of the switch 130, including the flow of signals, can be reversed.

If the switch 130 is moved to the second position (510), signals are transmitted from the wireless headset 110 to the mobile communications device 140 through the switch 130 and the wireless adapter 120 (515). Thus, the switch 130 can be used to implement push-to-talk functionality. For example, a user of the wireless headset 110 can actuate the switch 130, causing the switch 130 to move to the second position in order to transmit communications through the mobile communications device 140. In some implementations, the switch 130 can be actuated using a trigger included in the switching unit 115. In other implementations, a handheld trigger switch can be coupled to the switching unit 115 to perform the switching. In still other implementations, the switch 130 can be automatically actuated in accordance with a signal level associated with a microphone included in the wireless headset 110.

As long as the switch 130 is in the second position (520), signals received by the wireless headset 110 are transmitted to the mobile communications device 140, such as for transmission (515). If, however, the switch 130 is returned to the first position (520), signals are then transmitted from the mobile communications device 140 to the wireless headset 110 through the switch 130 and the wireless adapter (505).

Figure 6:
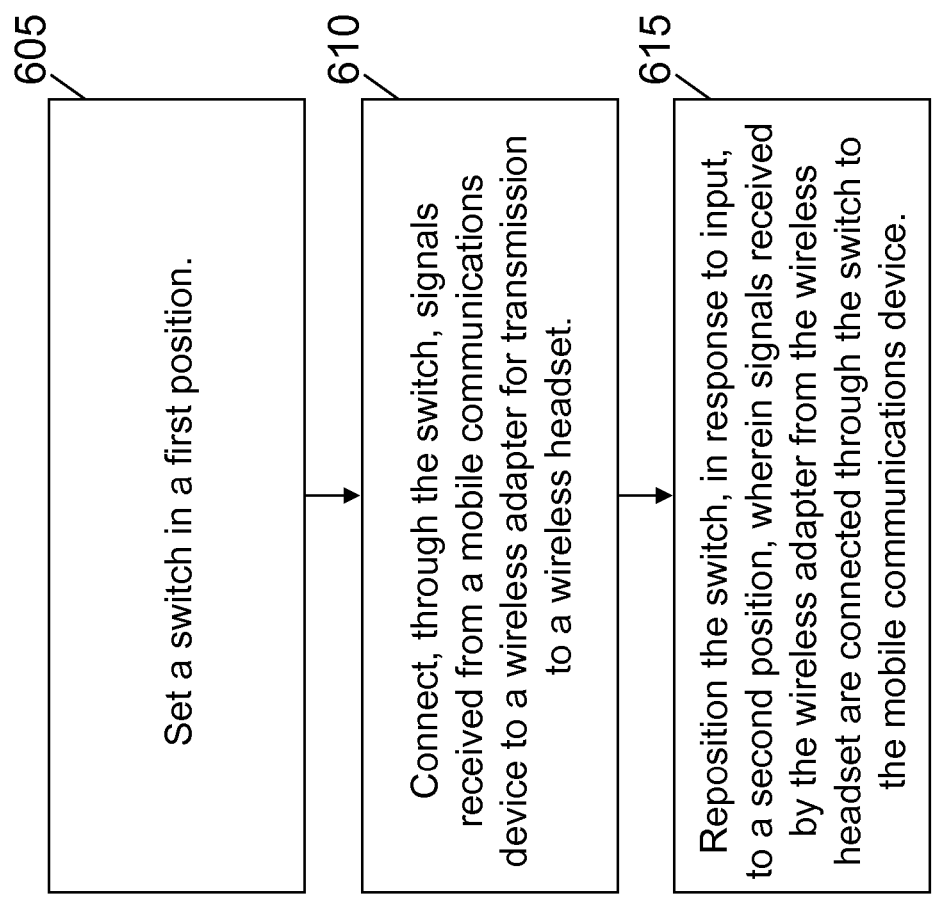
FIG. 6 discloses an exemplary method of switching signals.

FIG. 6 discloses an exemplary method of switching signals. Initially, a switch can be set in a first position (605). The switch, e.g., can be set to a default position in which the normally closed connections are connected. Further, signals received from a mobile communications device can be connected through the switch to a wireless adapter for transmission to a wireless headset (610). Additionally, the switch can be repositioned, in response to input, to a second position, wherein signals received by the wireless adapter from the wireless headset are connected through the switch to the mobile communications device (615). For example, audio data captured by a microphone included in the wireless headset can be received by the wireless adapter and transmitted through the switch to a mobile communications device interface.

A number of implementations have been disclosed herein. Nevertheless, it will be understood that various modifications may be made without departing from the spirit and scope of the claims. Accordingly, other implementations are within the scope of the following claims.

What is claimed is:

1. A system comprising:
a mobile two-way radio device;
a wireless headset including a speaker and a microphone; and
a switching unit, separate from and detachably coupled to the mobile two-way radio device through a cabled connection, the switching unit comprising:
a mobile two-way radio device interface for transmitting signals to and receiving signals from the mobile two-way radio device;
a wireless adapter for transmitting signals to and receiving signals from the wireless headset; and
a switch coupled to the mobile two-way radio device interface, the wireless headset, and the wireless adapter, wherein the switch is configured to automatically implement push-to-talk functionality by selectively connecting signals between the wireless adapter, the wireless headset, and the mobile two-way radio device interface,
wherein a trigger signal generated when a signal level associated with the microphone exceeds a predetermined threshold causes the switch to be set to a first position in which a signal captured by the microphone is connected to the mobile two-way radio device interface and a trigger signal generated when the signal level associated with the microphone falls below a predetermined threshold for a predetermined period of time causes the switch to be set to a second position in which a signal captured by the microphone is not connected to the mobile two-way radio device interface and a signal is transmitted from the mobile two-way radio device to the speaker of the wireless headset.

2. The system of claim 1, wherein the wireless headset and the wireless adapter use the Bluetooth protocol to communicate and the wireless headset can communicate with another device without physical modification.

3. The system of claim 1, further comprising at least one direct wired connection between the mobile two-way radio device interface and the wireless adapter.

4. The system of claim 1, wherein the switch can be manually actuated in response to trigger signals received from a hand-held trigger switch that is detachably coupled to the switching unit through a cabled connection.

5. An apparatus for switching signals, the apparatus comprising:
a housing detachably coupled to a mobile two-way radio device though a cabled connection, the housing containing:
a mobile two-way radio device interface for transmitting signals to and receiving signals from a mobile two-way radio device;
a wireless adapter for transmitting signals to and receiving signals from a wireless headset that includes a speaker and a microphone; and
a switch coupled to the mobile two-way radio device interface and the wireless adapter, wherein the switch is configured to automatically implement push-to-talk functionality by selectively connecting signals between the wireless adapter and the mobile two-way radio device interface;
wherein a trigger signal generated when a signal level associated with the microphone exceeds a predetermined threshold causes the switch to be set to a first position in which a signal captured by the microphone is connected to the mobile two-way radio device interface and a trigger signal generated when the signal level associated with the microphone falls below a predetermined threshold for a predetermined period of time causes the switch to be set to a second position in which a signal captured by the microphone is not connected to the mobile two-way radio device interface and a signal is transmitted from the mobile two-way radio device to the speaker of the wireless headset.

6. The apparatus of claim 5, further including a hand-held trigger switch detachably coupled to the housing through a cabled connection, the hand-held trigger switch being adapted to generate trigger signals to cause the switch to selectively connect signals between the wireless adapter, the wireless headset, and the mobile two-way radio device interface.

7. The apparatus of claim 5, wherein the wireless adapter is configured to communicate with the wireless headset using the Bluetooth protocol, wherein the wireless headset further can communicate with another communication device without physical modification.

8. A method of switching signals using a switching unit that is separate from and detachably coupled to a mobile two-way radio device, the method comprising:
setting a switch included in the switching unit to a first position;
connecting, through the switch, signals received from the mobile two-way radio device to a wireless adapter for transmission to a wireless headset; and
automatically repositioning the switch, in response to determining that a signal level associated with a microphone in the wireless headset exceeds a predetermined threshold, to a second position, wherein signals received by the wireless adapter from the wireless headset are connected through the switch to the mobile two-way radio device; wherein automatically repositioning the switch to the first position in response to determining that the signal level associated with the microphone of the wireless headset has dropped below a predetermined threshold for a predetermined period of time.

9. The method of claim 8, further comprising transmitting signals from the wireless adapter to the wireless headset using a short-range radio frequency protocol.

10. The system of claim 1, wherein the wireless headset and the wireless adapter employ a frequency hopping algorithm for communication with one another.

11. The system of claim 1, wherein the switching unit further includes:
a trigger switch interface through which a hand-held trigger switch can be detachably coupled to the switching unit.

12. The system of claim 11, wherein a trigger included in the switching unit is not disabled when the hand-held trigger switch is coupled to the switching unit and trigger signals received from the hand-held trigger switch are used to selectively connect signals between the wireless adapter, the wireless headset and the mobile two-way radio device interface.

13. The apparatus of claim 6, wherein the housing further includes a trigger that can be used to manually generate a trigger signal to cause the switch to move between the first position and the second position.

14. The apparatus of claim 13, wherein the trigger included in the housing is disabled when the hand-held trigger switch is coupled to the housing.

15. The method of claim 8, further comprising:
receiving a trigger signal generated through actuation by a user of a hand-held trigger switch that is detachably coupled to the switching unit through a cabled connection; and
repositioning the switch in response to the received trigger signal without reference to the signal level associated with the microphone in the wireless headset.

16. The method of claim 8, further comprising:
receiving a trigger signal generated through actuation by a user of a trigger included in the switching unit; and
repositioning the switch in response to the received trigger signal without reference to the signal level associated with the microphone in the wireless headset.

17. The method of claim 8, further comprising:
providing power to the switching unit constantly from an internal rechargeable battery power supply.

18. The method of claim 8, further comprising:
transmitting by the wireless adapter, when the switch is in the first position, signals received from the mobile two-way radio device to the wireless headset in accordance with a frequency hopping algorithm.

19. The method of claim 8, further comprising:
disabling, when the switch is in the second position, transmission of signals received from the mobile two-way radio device to the wireless headset.

* * * * *